(12) United States Patent
Steinmoeller et al.

(10) Patent No.: US 8,681,928 B2
(45) Date of Patent: Mar. 25, 2014

(54) PRESSURIZER BAFFLE PLATE AND PRESSURIZED WATER REACTOR (PWR) EMPLOYING SAME

(75) Inventors: Franz E. Steinmoeller, Ontario (CA); Michael J. Edwards, Lynchburg, VA (US); Nick Idvorian, Ontario (CA); Yuanming R. Li, Ontario (CA)

(73) Assignees: Babcock & Wilcox Canada Ltd., Cambridge, Ontario (CA); Babcock & Wilcox Nuclear Energy, Inc., Lynchburg, VA (US)

( * ) Notice: Subject to any disclaimer, the term of this patent is extended or adjusted under 35 U.S.C. 154(b) by 505 days.

(21) Appl. No.: 13/108,734

(22) Filed: May 16, 2011

(65) Prior Publication Data
US 2012/0294410 A1   Nov. 22, 2012

(51) Int. Cl.
| G21C 15/02 | (2006.01) |
| G21C 1/08 | (2006.01) |
| G21C 15/00 | (2006.01) |
| G21C 1/00 | (2006.01) |

(52) U.S. Cl.
USPC ............ 376/399; 376/347; 376/361; 376/395

(58) Field of Classification Search
CPC ......... Y02E 30/00; Y02E 30/30; Y02E 30/31; Y02E 30/32; Y02E 30/38; Y02E 30/39; Y02E 30/40; G21C 1/00; G21C 1/04; G21C 1/06; G21C 1/08; G21C 1/082; G21C 1/084; G21C 5/00; G21C 5/02; G21C 13/00; G21C 13/02; G21C 15/00; G21C 15/02; G21C 15/24

USPC ......... 376/277, 282, 283, 347, 352, 361, 395, 376/399, 400, 402, 403, 409, 426, 434, 438, 376/439; 122/30, 32

See application file for complete search history.

(56) References Cited

U.S. PATENT DOCUMENTS

| 3,915,123 | A | * | 10/1975 | Reisacher | 122/32 |
| 4,039,377 | A | * | 8/1977 | Andrieu et al. | 376/400 |
| 4,213,824 | A | * | 7/1980 | Jabsen | 376/283 |
| 4,246,069 | A | * | 1/1981 | Dupuy et al. | 376/403 |
| 4,859,401 | A | * | 8/1989 | Murase et al. | 376/282 |
| 7,929,657 | B2 | * | 4/2011 | Muller et al. | 376/352 |

* cited by examiner

*Primary Examiner* — Bernarr Gregory
(74) *Attorney, Agent, or Firm* — Michael J. Seymour; Eric Marich

(57) ABSTRACT

A pressurized water reactor (PWR) includes a pressure vessel and a nuclear reactor core disposed in the pressure vessel. A baffle plate is disposed in the pressure vessel and separates the pressure vessel into an internal pressurizer volume disposed above the baffle plate and an operational PWR volume disposed below the baffle plate. The baffle plate comprises first and second spaced apart plates and includes a pressure transfer passage having a lower end in fluid communication with the operational PWR volume and an upper end in fluid communication with the internal pressurizer volume at a level below an operational pressurizer liquid level range. A vent pipe has a lower end in fluid communication with the operational PWR volume and an upper end in fluid communication with the internal pressurizer volume at a level above the operational pressurizer liquid level range.

29 Claims, 5 Drawing Sheets

US 8,681,928 B2

PRESSURIZER BAFFLE PLATE AND PRESSURIZED WATER REACTOR (PWR) EMPLOYING SAME

BACKGROUND

The following relates to the nuclear reactor arts, electrical power generation arts, nuclear reactor control arts, nuclear electrical power generation control arts, thermal management arts, and related arts.

Nuclear reactors employ a reactor core comprising a mass of fissile material, such as a material containing uranium oxide ($UO_2$) that is enriched in the fissile $^{235}U$ isotope. A primary coolant, such as light water or heavy water flows through the reactor core to extract heat for use in heating water or another secondary coolant to generate steam, or for some other useful purpose. For electrical power generation, the steam is used to drive a generator turbine. In thermal nuclear reactors, the water also serves as a neutron moderator that thermalizes neutrons, which enhances reactivity of the fissile material. Various reactivity control mechanisms, such as mechanically operated control rods, chemical treatment of the primary coolant with a soluble neutron poison, or so forth are employed to regulate the reactivity and resultant heat generation.

In a pressurized water reactor (PWR), the light water (or other primary coolant) is maintained in a subcooled state in a sealed pressure vessel that also contains the reactor core. In the PWR, both pressure and temperature of the primary coolant are controlled. An external pressurizer may be used for pressure control; however, an external pressurizer entails an additional large-diameter pressure vessel penetration to connect the external pressurizer with the pressure vessel. Various internal pressurizer configurations are also known.

Disclosed herein are improvements that provide various benefits that will become apparent to the skilled artisan upon reading the following.

BRIEF SUMMARY

In one aspect of the disclosure, an apparatus comprises a pressurized water reactor (PWR) including a pressure vessel and a nuclear reactor core disposed in the pressure vessel. A baffle plate is disposed in the pressure vessel and separates the pressure vessel into an internal pressurizer volume disposed above the baffle plate and an operational PWR volume disposed below the baffle plate. The baffle plate includes a transfer passage having a lower end in fluid communication with the operational PWR volume and an upper end in fluid communication with the internal pressurizer volume at a level below an operational pressurizer liquid level range. A vent pipe has a lower end in fluid communication with the operational PWR volume and an upper end in fluid communication with the internal pressurizer volume at a level above the operational pressurizer liquid level range. In some such apparatus, the baffle plate comprises first and second spaced apart plates.

In another aspect of the disclosure, an apparatus comprises a pressurized water reactor (PWR) including a pressure vessel configured to contain a nuclear reactor core and a baffle plate disposed in the pressure vessel. The baffle plate separates the pressure vessel into an internal pressurizer volume disposed above the baffle plate and an operational PWR volume disposed below the baffle plate. The baffle plate comprises first and second spaced apart plates.

In another aspect of the disclosure, an apparatus comprises a baffle plate configured to be disposed in a pressurized water reactor (PWR) with a first side of the baffle plate facing an internal pressurizer volume and an opposite second side of the baffle plate facing an operational PWR volume. A vent pipe passes through the baffle plate and has first end in fluid communication with the first side of the baffle plate and an opposite second end in fluid communication with the second side of the baffle plate. The first end of the vent pipe is relatively closer to the baffle plate and the second end of the vent pipe is relatively further away from the baffle plate.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 1:
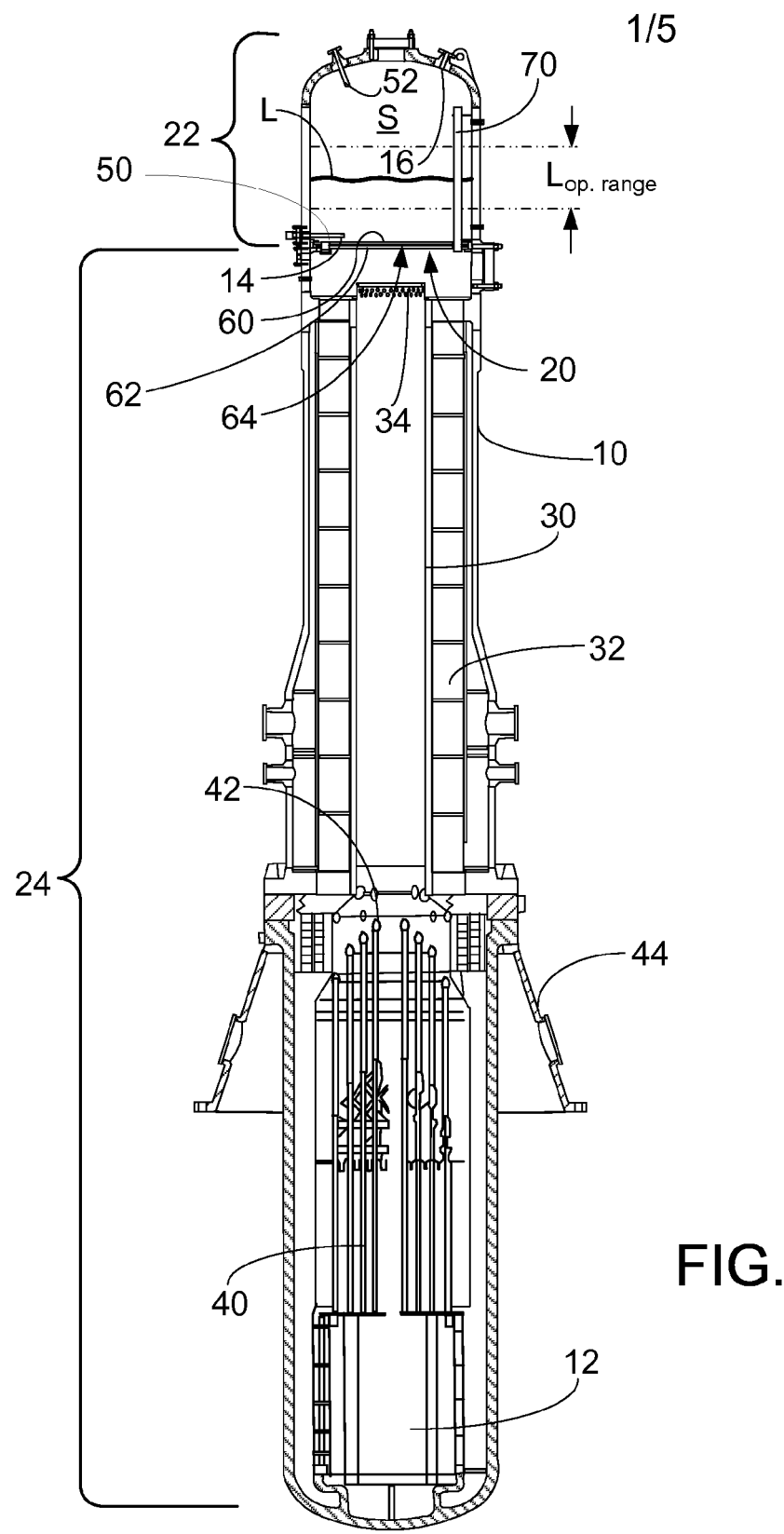
FIG. 1 diagrammatically shows a pressurized water reactor (PWR) embodiment of the present invention which includes an internal pressurizer.

With reference to FIG. 1, an illustrative nuclear reactor of the pressurized water reactor (PWR) type includes a pressure vessel 10 and a nuclear reactor core 12 disposed in the pressure vessel 10. The reactor core 12 comprises a mass of fissile material, such as a material containing uranium oxide ($UO_2$) that is enriched in the fissile $^{235}U$ isotope, arranged fuel rod bundles disposed in a fuel basket or other support assembly configured to mount in suitable mounting brackets or retention structures of the pressure vessel 10.

The pressure vessel contains a primary coolant up to a level L indicated in FIG. 1. In the PWR configuration, the primary coolant is maintained in a subcooled state in which both pressure and temperature are controlled. In the illustrative PWR of FIG. 1, the pressure is maintained using an internal pressurizer comprising a steam bubble S disposed at the top of the pressure vessel 10. Resistive heaters 14 or another heating device are provided to heat the steam bubble so as to increase the pressure. On the other hand, spray nozzles or spargers 16 are suitably provided to inject cool water or steam into the steam bubble to reduce the pressure. (Note that the control elements 14, 16 are shown diagrammatically).

The internal pressurizer is contained within the pressure vessel 10. In the illustrative example, a baffle plate 20 is disposed in the pressure vessel 10. The baffle plate 20 separates the pressure vessel into an internal pressurizer volume 22 disposed above the baffle plate and an operational PWR volume 24 disposed below the baffle plate. The internal pressurizer volume 22 contains a portion of primary coolant extending from the baffle plate 20 up to the level L of the primary coolant in the PWR, and also contains the steam bubble S disposed above the level L.

The level L of the primary coolant may vary during normal operation of the PWR within an operational pressurizer liquid level range $L_{op.range}$. The operational pressurizer liquid level range $L_{op.range}$ is to be understood as the allowable range of the level L during any normal mode of PWR operation. A value for the level L that is outside of the operational pressurizer liquid level range $L_{op.range}$ constitutes abnormal operation requiring intervention of reactor operations personnel. For example, a loss of coolant accident (LOCA) may cause the primary coolant level to decrease below the operational pressurizer liquid level range $L_{op.range}$—this is not normal operation, and indeed a LOCA generally results in immediate shutdown of reactor operation. Similarly, some events or conditions may cause the primary coolant level to increase above the operational pressurizer liquid level range $L_{op.range}$—again, this is not normal operation. In some cases, deviation of the liquid level range outside of the operational pressurizer liquid level range $L_{op.range}$ may not call for reactor shutdown, but may instead be remediated control operations that bring reactor operational parameters into normal range, including bringing the level L into the operational pressurizer liquid level range $L_{op.range}$.

It should also be noted that a particular current operational condition or mode of the PWR (e.g., operation at a particular power output level or a particular primary coolant temperature) may impose a more stringent restriction on the level of primary coolant than $L_{op.range}$. As used herein, the operational pressurizer liquid level range $L_{op.range}$ is to be understood as the allowable range of the level L during any normal mode of PWR operation—a particular normal mode of PWR operation may impose a more stringent restriction of the primary coolant level. By way of illustration, consider levels L1<L2<L3<L4, and two operational modes: a first mode operating at temperature T1 for which the coolant level is restricted to the range [L1, L3] and a second mode operating at a temperature T2>T1 for which the coolant level is restricted to the range [L2, L4]. Assuming for simplicity that these are the only two operational modes for the PWR, the operational pressurizer liquid level range $L_{op.range}$ is [L1, L4].

With continuing reference to FIG. 1, the illustrative PWR includes a central riser 30 disposed coaxially inside the pressure vessel 10. Primary coolant that is heated by the nuclear reactor core 12 flows upwardly inside the central riser 30 and discharges at a top of the central riser 30 which is proximate to (or in some contemplated embodiments connected with) the baffle plate 20. The discharged primary coolant reverses flow direction and flows downward outside the central riser 30 through an annulus 32 defined by the central riser 30 and the pressure vessel 10. Optionally, the top of the central riser 30 includes a perforated screen 34 to promote flow reversal from the upward direction inside the central riser 30 to the downward direction in the outer annulus 32.

Although not illustrated, in some embodiments an integral steam generator is disposed in the annulus 32. In a typical configuration, feedwater (constituting a secondary coolant different from the primary coolant) flows in a generally upward direction either inside or outside one or more steam generator tubes (not shown) disposed inside the annulus 32. The primary coolant flows generally downward through the annulus 32 in the other of the inside or outside of the one or more steam generator tubes. (In other words, the primary coolant may flow generally downward outside the steam generator tube or tubes while the secondary coolant flows generally upward inside the steam generator tube or tubes, or, alternatively, the primary coolant may flow generally downward inside the steam generator tube or tubes while the secondary coolant flows generally upward outside the steam generator tube or tubes). The steam generator tubes may have various geometries, such as vertically straight steam generator tubes, or a helical steam generator tube encircling the central riser 30. A PWR that includes an integral steam generator is sometimes referred to in the art as an integral PWR. Although the integral steam generator is typically located in the annulus 32, it is also contemplated to locate an integral steam generator (or a portion thereof) elsewhere inside the pressure vessel 10, such as inside the central riser 30.

In other embodiments, the steam generator is external to the pressure vessel 10, and the primary coolant heated by the reactor core 12 is piped from the pressure vessel 10 to the external steam generator (not shown) via suitable piping. In yet other contemplated embodiments, the PWR is used for a purpose other than generating steam, and there is no steam generator at all.

Reactivity control mechanisms are suitably provided to control nuclear reactivity in the reactor core 12. In the illustrative embodiment, a plurality of neutron-absorbing control rods 40 are operated by a control rod drive mechanism (CRDM) or mechanisms 42 to controllably insert or withdraw the control rods 40 into or out of the reactor core 12. Inserting the control rods reduces reactivity, while withdrawing the control rods increases reactivity. The illustrative CRDM 42 is an internal CRDM 42 that is disposed inside the pressure vessel 10; alternatively, the CRDM may be an external CRDM that is disposed outside of and above the pressure vessel 10, with suitable mechanical penetrations to connect with the control rods. Additionally or alternatively, a soluble neutron poison such as boric acid may optionally be added to the primary coolant in controlled amounts to control reactivity. As yet another illustrative example, processes that form voids in the primary coolant can affect reactivity by modifying the moderator action of the primary coolant (these embodiments employ light water, heavy water, or another primary coolant that serves as a neutron moderator), and suitable control of such a process can provide an alternative or additional reactivity control mechanism.

The PWR suitably includes other elements that are not illustrated in diagrammatic FIG. 1, such as monitoring sensors, valving and other components for safety systems, an external containment structure, or so forth. Circulation of the primary coolant inside the pressure vessel 10 (e.g., flowing upward through the central riser 30 and downward through the annulus 32 back to the reactor core 12) may be driven by natural convection, or may be actively driven or assisted by primary coolant pumps (not shown). The illustrative PWR pressure vessel 10 is mounted in a generally upright position via a support skirt 44 with a lower portion of the pressure vessel 10 that contains the reactor core 12 disposed underground. (In some contemplated embodiments, the entire pressure vessel 10 may be below ground, with the lower portion of the pressure vessel 10 that contains the reactor core 12 disposed in a deeper recess or pit). While the aforementioned partially or wholly subterranean arrangements are advantageous from a safety standpoint, other arrangements are also contemplated, such as placement of the PWR on a maritime or naval vessel to provide nuclear power for operating the vessel. Moreover, the PWR diagrammatically illustrated in FIG. 1 is an example, and other configurations for the reactor vessel, primary coolant circulation path, and so forth may be employed.

In a PWR including an integral pressurizer, such as that shown by way of illustrative example in FIG. 1, the internal pressurizer volume 22 and the operational PWR volume 24 are both contained in the pressure vessel 10, but are separated by the baffle plate 20. There should be sufficient fluid communication across the baffle plate 20 such that pressure changes in the internal pressurizer volume 22 are effective to control the pressure in the operational PWR volume 24. Additionally, the baffle plate 20 contributes to diverting the upwardly flowing primarily coolant discharged from the central riser 30 into the outer annulus 32.

It is recognized herein that thermal characteristics of the baffle plate 20 are also advantageously considered. To provide an illustrative example, in one operational mode simulated for a PWR similar to that shown in FIG. 1, the operational PWR volume is designed to operate with primary coolant comprising water in a compressed or subcooled liquid phase. A typical value for the sub-cooled liquid phase is in the range of about 310° C. to about 325° C. To maintain the desired pressure, the internal pressurizer volume 22 is maintained at a higher temperature that preferably corresponds to the saturation temperature of the primary coolant water and is preferably about 5° C. to about 35° C. above that of the subcooled liquid. The water in the pressurizer volume 22 is in the liquid phase below the water level L and in the gaseous phase in the steam bubble S above the water level L. With substantial fluid communication between the two volumes 22, 24, the pressure generated in the higher-temperature pressurizer volume 22 is efficiently transferred to the operational PWR volume 24 to provide pressure control.

However, it is recognized herein that the aforementioned substantial fluid communication also implies substantial thermal communication between the two volumes 22, 24. Heat is thus efficiently transferred from the higher temperature pressurizer volume 22 to the lower temperature, and larger, operational PWR volume 24. Consequently, the heaters 14 are operated to maintain the higher temperature of the pressurizer volume so as to maintain the desired pressure. In simulations, about 80 kW of power are input to the heaters 14 to maintain the desired temperature of the pressurizer volume. It is recognized herein that this results in inefficient operation of the PWR, and can have other deleterious effects such as introducing a temperature gradient in the operational PWR volume 24.

Accordingly, the disclosed baffle plates are designed to be thermally insulating. Toward this end, the baffle plate 20 is designed to suppress flow of primary coolant between the two volumes 22, 24 during steady state operation. This entails increasing the flow resistance across the baffle plate 20. In the illustrative example, fluid communication across the baffle plate 20 during normal operation is via one or more designated pressure transfer passages 50. Each pressure transfer passage 50 has a lower end in fluid communication with the operational PWR volume 24 and an upper end in fluid communication with the internal pressurizer volume 22 at a level below the operational pressurizer liquid level range $L_{op.range}$. This ensures that the upper end of the pressure primary transfer passage 50 remains immersed in liquid prima coolant during any normal operation of the PWR.

The relatively higher flow resistance of the baffle plate 20 does reduce transient performance. However, it is recognized herein that a PWR used in power generation or another useful application is typically operated in steady state, with at most small transients being applied, except during startup and shutdown. By suppressing flow of primary coolant between the two volumes 22, 24, convective heat transfer between the two volumes 22, 24 is reduced, which increases the thermal insulation provided by the baffle plate 20.

The illustrative baffle plate 20 is also made more thermally insulating by constructing the baffle plate 20 to include a thermally insulating gap. In the embodiment of FIG. 1, the baffle plate 20 comprises first and second spaced apart plates 60, 62 that are separated by a gap 64 that serves as a thermal insulator. Although two spaced apart plates 60, 62 are illustrated, the number of spaced apart plates can be increased to three or more plates to provide further thermally insulating gaps. The plates 60, 62 are suitably metal plates, for example made of steel or another metal comporting with the rigorous environment inside the pressure vessel 10 of the PWR.

The relatively high flow resistance provided by the pressure transfer passages 50 advantageously increases the effective thermal insulation provided by the baffle plate 20. However, in some accident scenarios in which pressure builds up inside the pressure vessel 10, this high flow resistance can be problematic. In an accident scenario including pressure elevation, the increasing pressure is conventionally relieved via a suitable relief valve 52, which is suitably operatively connected with the steam bubble S proximate to the top of the pressure vessel 10. In such a situation, the high flow resistance of the baffle plate 20 could result in delayed pressure relief and/or rupture of the baffle plate 20.

In the embodiment of FIG. 1, one or more vent pipes 70 are provided to accommodate an accident scenario in which pressure builds up in the pressure vessel 10. The vent pipes 70 provide a larger fluid pathway for relieving pressure. However, it is not desired for the vent pipes 70 to conduct fluid (and hence promote convective heat transfer) during normal operation of the PWR. In the embodiment of FIG. 1, each vent pipe 70 has a lower end in fluid communication with the operational PWR volume 24 and an upper end in fluid communication with the internal pressurizer volume 22, but at a level above the operational pressurizer liquid level range $L_{op.range}$. This places the upper end of the vent pipe 70 in the steam bubble S. As a result, primary coolant does not flow through the vent pipe 70 during normal operation of the PWR, and so the vent pipe 70 provides no (or negligible) contribution to heat transfer across the baffle plate 20. On the other hand, in the event of an accident in which pressure inside the pressure vessel 10 rises, the vent pipes 70 are available to conduct fluid (either liquid or gaseous primary coolant) into the internal pressurizer volume 22 so as to be released by the relief valve 52.

Figure 2:
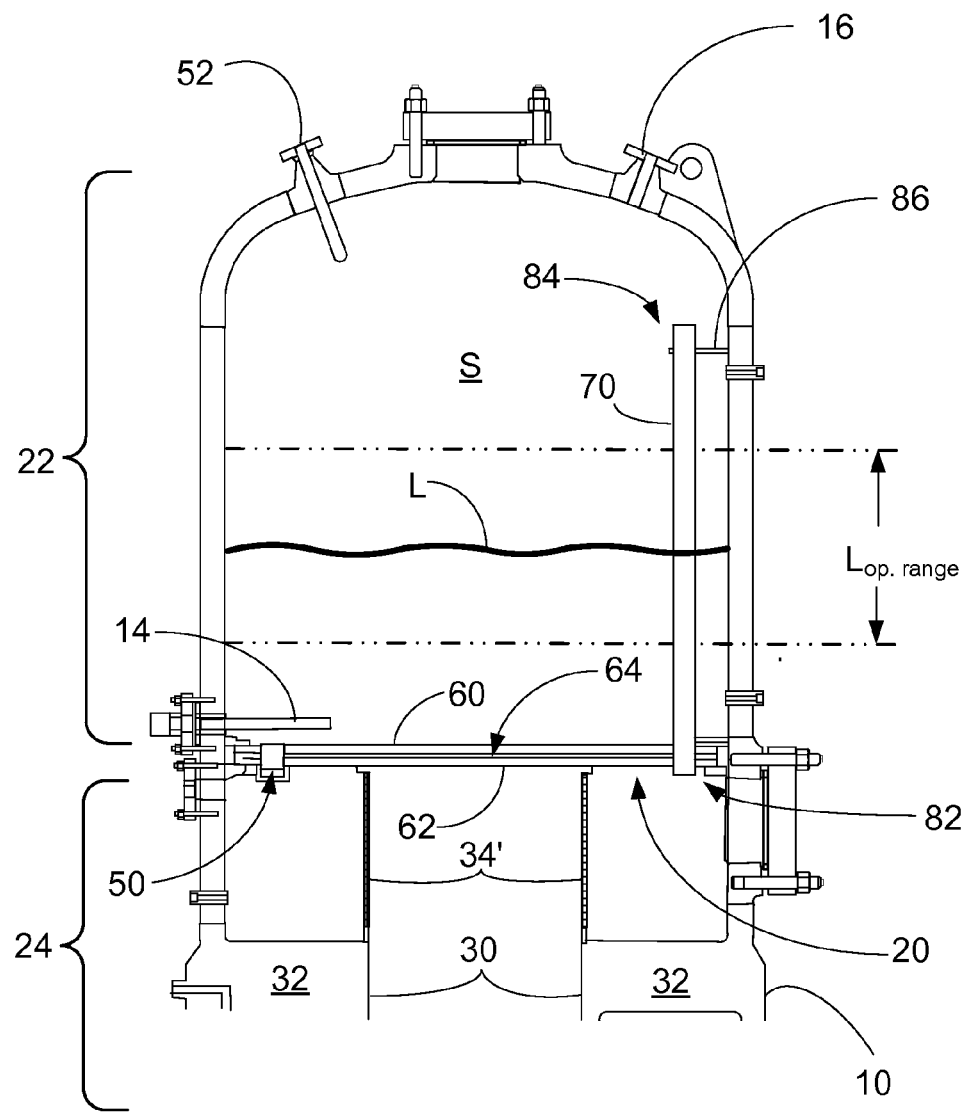
FIG. 2 diagrammatically shows an upper portion of the PWR of FIG. 1 with another embodiment of the internal pressurizer and selected related components.

With reference to FIG. 2, an enlarged view (as compared with the view of FIG. 1) is shown of a variant embodiment that also includes the baffle plate 20 defining the internal pressurizer volume 22 and the operational PWR volume 24, with the steam bubble S located in the pressurizer volume 22. The internal pressurizer of FIG. 2 also includes heaters 14 and the steam vent spray nozzles or spargers 16 for pressure control. The illustrative baffle plate 20 of FIG. 2 also comprises first and second plates 60, 62 spaced apart by the gap 64, and includes pressure transfer passages 50 (only one of which is shown by way of illustrative example in FIG. 2) passing through the baffle plate 20, and further includes vent pipes 70 (again, only one of which is shown by way of illustrative example in FIG. 2). As seen in FIG. 2, a lower end 82 of the vent pipe 70 is in fluid communication with the operational PWR volume 24 and an upper end 84 of the vent pipe 70 extends above the operational pressurizer liquid level range $L_{op.range}$, into the steam bubble S. In FIG. 2, a vent pipe support 86 provides support for the upper end 84 of the vent pipe 70 which extends relatively further away from the baffle plate 20 as compared with the lower end of the vent pipe 70.

The embodiment of FIG. 2 differs from that of FIG. 1 in the detailed shape of the portion of the pressure vessel 10 defining the internal pressurizer volume 22, and in the use of a different perforated screen 34' at the upper end of the central riser 30. The illustrative perforated screen 34' extends from the central riser 30 to the baffle plate 20 such that all upwardly flowing primary coolant discharging at the upper end of the central riser 30 passes through the perforated screen 34'. It should be noted that in some embodiments the perforated screen 34' is formed integrally with the central riser 30, for example by forming openings (that is, perforations) at the top of the central riser 30 to define the perforated screen 34'.

In the embodiments of both FIGS. 1 and 2, the pressure transfer passages 50 are located outside of the perforated screen 34, 34'. At this outer location, the primary coolant flow is transitioning from the upward flow direction to the downward flow direction, and accordingly has a substantial (or, with suitable flow design, entirely) lateral flow component directed parallel with the baffle plate 20. This lateral flow is transverse to the flow direction inside the pressure transfer passages 50, which further reduces flow of primary coolant between the volumes 22, 24.

Figure 3:
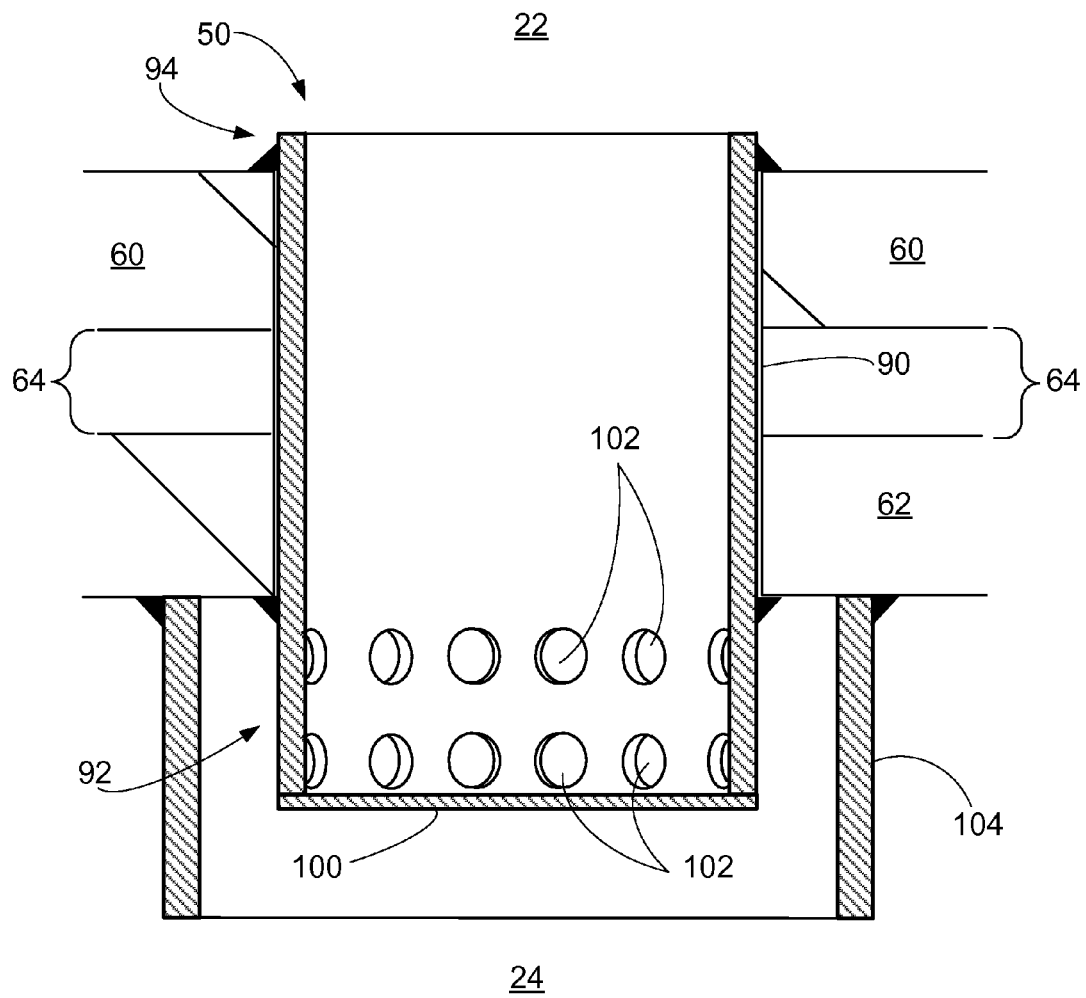
FIG. 3 diagrammatically shows an illustrative embodiment in which the pressure transfer passage is embodied by a surge pipe.

With reference to FIG. 3, the pressure transfer passages 50 are suitably configured to further reduce flow of primary coolant between the volumes 22, 24. In the illustrative pressure transfer passage 50 of FIG. 3, this is accomplished by employing a pressure transfer passage 50 embodied as a surge pipe 90 passing through the baffle plate 20 (that is, in this embodiment, first and second constituent plates 60, 62). The surge pipe 90 has a lower end 92 in fluid communication with the operational PWR volume 24, and an upper end 94 in fluid communication with the internal pressurizer volume 22 at a level below the operational pressurizer liquid level range $L_{op.range}$ (shown in FIGS. 1 and 2). The lower end 92 of the surge pipe 90 includes a closing plate 100, and fluid communication to the operational PWR volume 24 is via perforations or holes 102 in the sides of the lower end 92. Further reduction in primary coolant flow is provided by an outer coaxial pipe 104. Since primary coolant flow in the operational PWR volume 24 proximate to the lower end 92 is substantially lateral (again, transitioning from the upward flow inside the central riser 30 to downward flow in the outer annulus 32), the outer coaxial pipe 104 promotes formation of a primary coolant stagnation zone at the lower end 92.

The illustrative configuration including features 100, 102, 104 is merely an illustrative example of a configuration of the pressure transfer passage 50 to reduce flow of primary coolant between the volumes 22, 24. Various other arrangements of baffles, constrictions, or flow barriers are also contemplated to provide reduced flow of primary coolant between the volumes 22, 24. Any such arrangements or configurations should provide sufficient fluid communication to enable the pressure transfer passage to perform its primary function of enabling control of pressure in the operational PWR volume 24 by adjustment of pressure in the internal pressurizer volume 22. The extent of fluid communication sufficient for this purpose depends upon the expected normal operating pressure, the acceptable (that is, designed) transient intervals, the type of primary coolant, and so forth.

Figure 4:
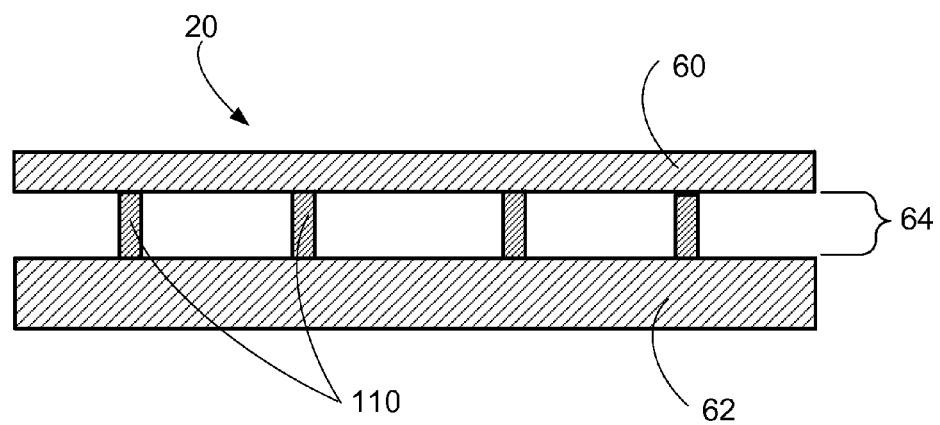
FIGS. 4 and 5 diagrammatically show two illustrative thermally insulating baffle plate embodiments.
Figure 5:
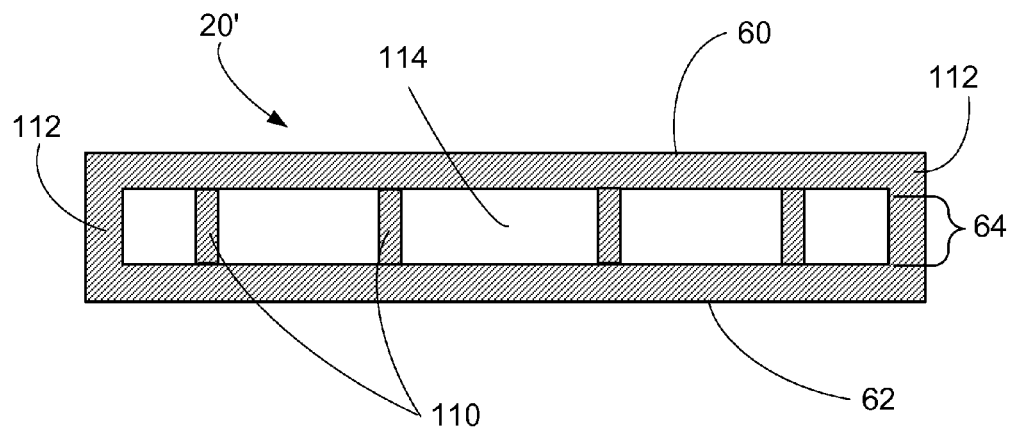

With reference to FIGS. 4 and 5, various approaches can be used to provide thermal insulation by construction of the baffle plate 20 comprising first and second plates 60, 62 spaced apart by the gap 64. In FIG. 4, the two plates 60, 62 are spaced apart by the gap 64, but are not sealed at their periphery. Suitable standoffs 110 secure the plates 60, 62 together and define the gap 64. In the embodiment of FIG. 4, the gap 64 is not a sealed volume. Rather, the first and second spaced apart plates 60, 62 define an unsealed volume 64 that fills with water when the baffle plate 20 is immersed in water. Thermal insulation is provided because water (or other primary coolant) in the unsealed volume 64 is stagnant and not flowing (or at least not rapidly flowing). Thus, the primary coolant in the unsealed volume 64 conveys heat primarily by thermal conduction, but not by thermal convection.

If further insulation is desired, an embodiment such as that of FIG. 5 can be employed. In this alternative embodiment, a baffle plate 20' comprises two plates 60, 62 that are spaced apart by the gap 64 in which the plates 60, 62 are sealed at their periphery by an annular seal 112 of metal or another material that is robust against the environment of the PWR. As a result, the gap 64 is a sealed volume in the embodiment of FIG. 5. The sealed volume can be filled with a gas 114, such as air, nitrogen, or so forth. This approach ensures that heat is conveyed across the gap 64 only by thermal conduction. In a further variation, it is contemplated for the sealed volume to be an evacuated volume (that is, "containing" a vacuum).

The illustrative baffle plates 20, 20' provide substantial thermal insulation. However, other thermally insulating baffle plates are also contemplated. For example, another contemplated baffle plate comprises a single plate (and hence no gap), with the single plate comprising a thermally insulating material that is robust in the environment inside the pressure vessel 10 of the PWR.

Steady state simulations have been performed for the baffle plate 20 of FIG. 4 in the pressurizer configuration of FIG. 2 with pressure transfer passages embodied as shown in FIG. 3 and further including the vent pipes 70. These simulations used the operating conditions of subcooled primary coolant in the operational PWR volume 24, and the internal pressurizer volume 22 containing primary coolant water at a higher temperature approximately 11° C. higher than the sub-cooled temperature corresponding to the saturation temperature of the primary coolant water. Using a single steel plate with high flow conductance to separate the two volumes 22, 24, the simulations indicated about 80 kW of power to the heaters 14 was sufficient to maintain the pressurizer at the saturation temperature. In contrast, when using the disclosed baffle plate 20 this heating was reduced to a few kW. The steady state simulations indicated that most of the improved performance was due to limiting flow of coolant across the baffle plate 20 in the steady state, with the use of the spaced apart plates 60, 62 providing secondary thermal improvement.

The vent pipes 70 are operative in certain accident scenarios. For example, in a loss of coolant accident (LOCA) scenario in which there is a full guillotine break a pressure relief valve nozzle 52, the vent pipes 70 minimize the pressure acting on the baffle plate 20. The vent pipes 70 allow the pressurized water (or other pressurized primary coolant) in the operational PWR volume 24 to bypass the pressure transfer passages 50 thus minimizing the pressure differential across the baffle plate 20. The vent pipe supports 86 allow for differential expansion between the vent pipes 70 and the shell of the pressure vessel 10.

Figure 6:
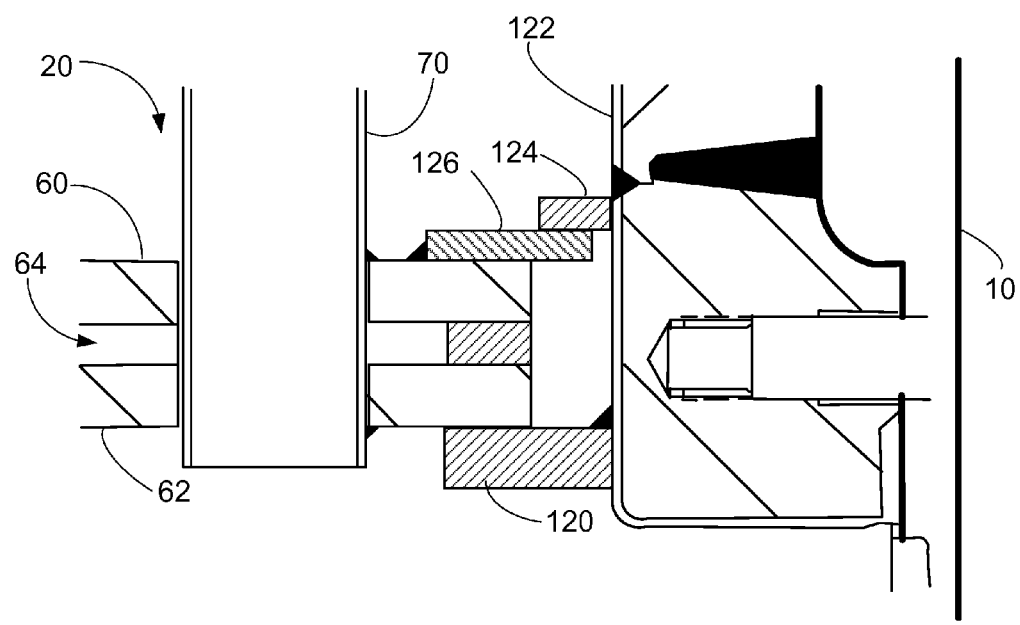
FIGS. 6-8 diagrammatically show suitable arrangements for mounting the baffle plate in the pressure vessel.
Figure 7:
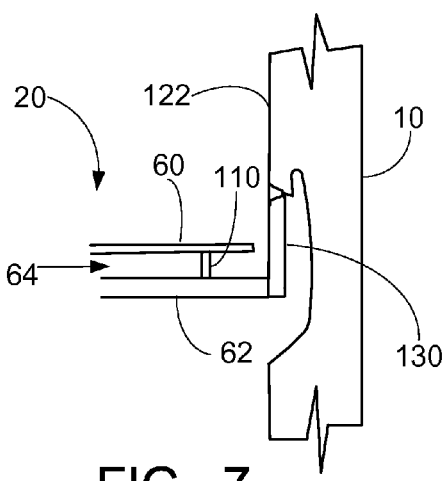
Figure 8:
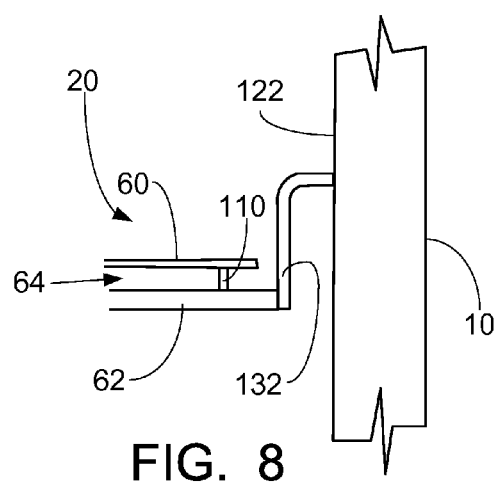

With reference to FIGS. 6-8, the mounting of the baffle plate 20 in the pressure vessel 10 can employ various connection configurations. Referring to FIG. 6, one embodiment for supporting the baffle plate 20 employs a lower support ring 120 that is welded to the shell 122 of the pressure vessel 10 with an upper support ring 124 that is also welded to the shell 122, that restrains the baffle plate 20 against any differential pressure across the baffle plate 20 as would be the case during a LOCA accident in which there is a full guillotine break at the pressure relief valve nozzle 52. In connection configuration of FIG. 6, flow across the baffle plate 20 via the periphery connection with the shell 122 can be suppressed or blocked entirely by including wedges 126 disposed between the upper metal plate 60 of the baffle plate 20 and the shell 122 or the upper support ring 124. The wedges 126 allow differential expansion between the baffle plate 20 and the shell 122 while maintaining a fluid seal.

With reference to FIGS. 7 and 8, another connection embodiment comprises attaching the lower plate 62 of the baffle plate 20 to the shell 122 of the pressure vessel 10 by welding. The upper plate 60 is supported on the lower plate 62 in this configuration by the standoffs 110. Any potential displacement of the shell 122 due to pressure dilation and temperature expansion is suitably accommodated by an intervening component disposed between the shell 122 and the lower plate 62 to absorb the differential expansion. In the embodiment of FIG. 7, this intervening component comprises a tongue 130 formed by removing a portion of the shell 122 by etching or a mechanical grinding process or so forth. In the embodiment of FIG. 8, this intervening component comprises an intervening bracket 132 welded onto the shell 122.

The connection configurations described with reference to FIGS. 6-8 are illustrative examples, and other connection configurations that accommodate differential thermal expansion and shell displacement while maintaining a suitable fluid seal are also contemplated.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. An apparatus comprising:
   a pressurized water reactor (PWR) including:
      a pressure vessel,
      a nuclear reactor core disposed in the pressure vessel,
      a baffle plate disposed in the pressure vessel and separating the pressure vessel into an internal pressurizer volume disposed above the baffle plate and an operational PWR volume disposed below the baffle plate wherein the baffle plate includes a pressure transfer passage having a lower end in fluid communication with the operational PWR volume and an upper end in fluid communication with the internal pressurizer volume at a level below an operational pressurizer liquid level range, and
      a vent pipe having a lower end in fluid communication with the operational PWR volume and an upper end in fluid communication with the internal pressurizer volume at a level above the operational pressurizer liquid level range.

2. The apparatus of claim 1, wherein the vent pipe is transverse to and passes through the baffle plate.

3. The apparatus of claim 1, wherein the pressure transfer passage comprises at least one surge pipe passing through the baffle plate and having a lower end in fluid communication with the operational PWR volume and an upper end in fluid communication with the internal pressurizer volume at a level below the operational pressurizer liquid level range.

4. The apparatus of claim 1, wherein a fluid flow path in the pressure transfer passage is transverse to and passes through the baffle plate.

5. The apparatus of claim 1 wherein the baffle plate comprises first and second spaced apart plates.

6. The apparatus of claim 5, wherein the first and second spaced apart plates define an unsealed volume that fills with water when the baffle plate is immersed in water.

7. The apparatus of claim 1, wherein the baffle plate comprises first and second spaced apart plates defining a sealed volume.

8. The apparatus of claim 1, wherein the baffle plate comprises:
   first and second spaced apart plates defining a sealed volume; and
   a gas disposed in the sealed volume.

9. The apparatus of claim 1, wherein the baffle plate comprises a thermally insulating barrier between the internal pressurizer volume disposed above the baffle plate and the operational PWR volume disposed below the baffle plate.

10. The apparatus of claim 1, wherein the PWR further comprises:
    a central riser disposed in the pressure vessel and having a lower end arranged to receive upwardly flowing primary coolant from the nuclear reactor core and an upper end arranged to discharge the upwardly flowing primary coolant toward the baffle plate.

11. The apparatus of claim 10, wherein the PWR further comprises:
    a perforated screen surrounding the upper end of the central riser.

12. The apparatus of claim 11, wherein the perforated screen extends from the central riser to the baffle plate such that all upwardly flowing primary coolant discharging at the upper end of the central riser passes through the perforated screen.

13. The apparatus of claim 11, wherein the lower end of the pressure transfer passage is disposed outside the perforated screen.

14. An apparatus comprising:
    a pressurized water reactor (PWR) including:
       a pressure vessel configured to contain a nuclear reactor core, and
       a baffle plate disposed in the pressure vessel and separating the pressure vessel into an internal pressurizer volume disposed above the baffle plate and an operational PWR volume disposed below the baffle plate, the baffle plate comprising first and second spaced apart plates.

15. The apparatus of claim 14, wherein the first and second spaced apart plates define an unsealed volume that fills with water when the baffle plate is immersed in water.

16. The apparatus of claim 14, wherein the baffle plate comprises first and second spaced apart plates defining a sealed volume.

17. The apparatus of claim 16, wherein the baffle plate further comprises:
    a gas disposed in the sealed volume.

18. The apparatus of claim 14, wherein the baffle plate comprises a thermally insulating barrier between the internal pressurizer volume disposed above the baffle plate and the operational PWR volume disposed below the baffle plate.

19. The apparatus of claim 14, wherein the PWR further comprises:
    a vent pipe having a lower end in fluid communication with the operational PWR volume and an upper end in fluid communication with the internal pressurizer volume at a level above an operational pressurizer liquid level range.

20. The apparatus of claim 19, wherein the baffle plate includes a pressure transfer passage having a lower end in fluid communication with the operational PWR volume and an upper end in fluid communication with the internal pressurizer volume at a level below an operational pressurizer liquid level range.

21. The apparatus of claim 14, wherein the baffle plate includes a pressure transfer passage having a lower end in fluid communication with the operational PWR volume and an upper end in fluid communication with the internal pressurizer volume.

22. The apparatus of claim 21, wherein the pressure transfer passage comprises at least one surge pipe passing through the baffle plate.

23. An apparatus comprising:
- a baffle plate configured to be disposed in a pressurized water reactor (PWR) with a first side of the baffle plate facing an internal pressurizer volume and an opposite second side of the baffle plate facing an operational PWR volume; and
- a vent pipe passing through the baffle plate and having first end in fluid communication with the first side of the baffle plate and an opposite second end in fluid communication with the second side of the baffle plate;
- wherein the first end of the vent pipe, is relatively closer to the baffle plate and the second end of the vent pipe is relatively further away from the baffle plate.

24. The apparatus of claim 23, wherein a distance of the second end of the vent pipe from the baffle plate is effective to position the second end of the vent pipe at a level above an operational pressurizer liquid level range.

25. The apparatus of claim 23, wherein the baffle plate comprises first and second spaced apart plates defining an unsealed volume that fills with water when the baffle plate is immersed in water.

26. The apparatus of claim 23, wherein the baffle plate comprises first and second spaced apart plates defining a sealed volume.

27. The apparatus of claim 23, wherein the baffle plate comprises:
- first and second spaced apart plates defining a sealed volume; and
- a gas disposed in the sealed volume.

28. The apparatus of claim 23, wherein:
- the baffle plate includes a pressure transfer passage different from the vent pipe, the pressure transfer passage passing through the baffle plate and having first end in fluid communication with the first side of the baffle plate and an opposite second end in fluid communication with the second side of the baffle plate, and
- the second end of the pressure transfer passage is relatively closer to the baffle plate than the second end of the vent pipe.

29. The apparatus of claim 28, wherein:
- a distance of the second end of the vent pipe from the baffle plate is effective to position the second end of the vent pipe at a level above an operational pressurizer liquid level range, and
- a distance of the second end of the pressure transfer passage from the baffle plate is effective to position the second end of the pressure transfer passage at a level below the operational pressurizer liquid level range.

* * * * *